United States Patent Office 3,115,526
Patented Dec. 24, 1963

3,115,526
ORGANO-METALLO COMPOUNDS AND METHOD OF PREPARATION
Gaetano F. D'Alelio, South Bend, Ind., assignor, by direct and mesne assignments, to Dal Mon Research Co., Cleveland, Ohio, a corporation of Delaware
No Drawing. Filed Oct. 8, 1958, Ser. No. 765,945
17 Claims. (Cl. 260—606.5)

This invention relates to ether compounds containing boron. More specifically, it pertains to the preparation of such compounds by the addition of boron compounds to unsaturated ethers.

Ethers, such as diethyl ether, diglyme, and tetrahydrofurane, have been known to catalyze the addition of diborane to compounds having ethylenic unsaturation therein, such as ethylene, propylene, styrene, etc. However, ether compounds have not been known to react with boron compounds to form new chemical derivatives having boron to carbon bonds.

In accordance with the practice of this invention, new compounds are prepared which contain both boron and ether groups therein. These compounds can be used as catalysts for the addition of boron hydrides and their hydrocarbon derivatives to ethylenic groups, as high energy fuels, and as intermediates in the preparation of organo-boron polymers, and some as monomers for copolymerization with other polymerizable vinyl and vinylidene monomers, and for grafting to polymers of various types.

The compounds of this invention are prepared by the addition of boron hydrides, or their hydrocarbon derivatives, sometimes hereinafter referred to generally as "boron hydride compounds," or "metal hydride compounds," with ether compounds having ethylenic unsaturation therein, such compounds being hereinafter referred to sometimes as "alkenyl compounds." The resultant products containing both boron and ether groups are sometimes hereinafter referred to as "boron-organo products," or "metal-organo products."

Typical boranes and substituted boranes that can be used in the practice of this invention include, but are not limited to, the following: diborane, triborane, tetraborane, pentaborane, hexaborane, decaborane, trimethyl borane, triethyl borane, tripropyl borane, tributyl borane, triamyl borane, trihexyl borane, tri-octyl borane, tri-decyl borane, tri-tetradecyl borane, tri-cyclohexyl borane, triphenyl borane, triphenethyl borane, monomethyl diborane, symmetrical dimethyl diborane, unsymmetrical dimethyl borane, trimethyl diborane, tetramethyl diborane, monoethyl diborane, symmetrical diethyl diborane, unsymmetrical diethyl diborane, triethyl diborane, tetraethyl diborane, monopropyl diborane, symmetrical dipropyl diborane, unsymmetrical dipropyl diborane, tripropyl diborane, tetrapropyl diborane, trimethyl triborane, tetramethyl triborane, hexamethyl triborane, tetraethyl tetraborane, hexaethyl tetraborane, etc.

Borane, or borine ($BH_3$) is unstable as such and dimerizes to diborane which reacts as two molecules of borane. Therefore, diborane is generally the reagent actually used. However, it is convenient to consider this as a reaction of borane, as indicated in various reactions described herein. Where reactions of mono-substituted boranes are indicated, it is generally also possible to use polyboranes having one such substituent on each boron atom, such as symmetrical dimethyl diborane, etc. Likewise, in reactions calling for disubstituted boranes, it is also possible to use polyboranes having two such substituents on each boron atom, such as tetramethyl diboranes, etc.

Typical examples of various other compounds having ethylenic unsaturation therein that can be used in the practice of this invention, include, but are not restricted to, the following: vinyl ethyl ether, vinyl butyl ether, vinyl propyl ether, vinyl amyl ether, vinyl cyclohexyl ether, vinyl phenyl ether, vinyl tolyl ether, isopropenyl methyl ether, isopropenyl isopropyl ether, isopropenyl butyl ether, isopropenyl phenyl ether, isopropenyl amyl ether, isobutenyl ethyl ether, allyl methyl ether, allyl ethyl ether, allyl propyl ether, butenyl ethyl ether, butenyl propyl ether, pentenyl amyl ether, vinyl cyclohexyl ether, vinyl cyclopentyl ether, para-vinyl anisole, allyl benzyl ether, vinyl benzyl ether, vinyl phenethyl ether, isopropenyl phenethyl ether, divinyl ether, diallyl ether, vinyl allyl ether, propenyl vinyl ether, propenyl allyl ether, divinyl ether of resorchinol, divinyl ether of ethylene glycol, diisopropenyl ether, isopropenyl allyl ether, isopropenyl butenyl ether, isopropenyl isoamylene ether, diallyl ether of resorcinol, diisobutenyl ether of hydroquinone, para-vinyloxy styrene, para allyloxy styrene, triallyloxy benzene, tripropenyloxy benzene, 2-methoxybutadiene-1,3, 2-ethoxy-butadiene-1,3, 2-phenoxy-butadiene-1,3, furane, 4,4'-divinyl-diphenyl-ether, 4,4'-divinyloxy-diphenyl, 4,4'-divinyl dicyclohexyl ether, vinyloxy cyclohexene, 4-vinyloxy vinyl cyclohexane, divinyloxy cyclohexane, divinyloxy cyclopentane, diallyloxy cyclohexane, 4-allyloxy-vinylcyclohexane, 3-ethoxy divinyl cyclohexane, dicyclohexenyloxy-benzene, p-cyclohexenyloxy-styrene, 4,4'-divinyl diphenyloxide, etc.

When monoalkenyl ether compounds are used in the practice of this invention, the desired molar proportions of ether to metal hydride compounds is determined mainly by the number of groups to be substituted on the metal. For example, if each of the valencies of the metal is to be satisfied by the ether compound, then any excess amount of alkenyl compound can be used. However, when less than complete substitution of the metal atom is to be made by the alkenyl compound, then the proportion of alkenyl compound to metal hydride compound is controlled so as to favor the degree of substitution desired. For example, if only one ether group is to be substituted, then the metal hydride compound should be used in excess to retard the formation of metal-organo products having a plurality of the ether substituents. However, the desirability of separating the desired product from either unreacted starting material, or from more highly substituted by-products will dictate the molar proportions which will give a more favorable yield of the desired product. In other cases, where a mixture of mono-, di-, and tri-substituted derivatives are desired, the mixture can be prepared directly by adjusting the ratio of the alkenyl compound to the metal compound.

When the alkenyl compound has a plurality of ethylenically unsaturated groups therein, it is desirable to use an excess of the alkenyl compound so as to suppress by-product polymer formation. When the metallo-organo product is to have only one substituent added thereon, a considerable excess of the alkenyl compound can be employed to suppress both polysubstitution and polymer formation. However, when all of the valencies of the metal atom are to be satisfied by the alkenyl compound having a plurality of ethylenically unsaturated groups, a compromise must be made so that the conditions permit the formation of byproducts having lower degrees of substitution on the metal atom as well as the polymeric by-products. Very often the preparation of metallo-organic products, fully substituted by the alkenyl compound, is favored by the use of an inert diluent which retards by-product polymer formation, thereby permitting a higher yield of the fully substituted metal-organo product.

High temperatures and prolonged reaction periods favor the production of byproduct polymers. Optimum reaction times and temperatures will vary according to the particular reactants. The yield of desired products will also vary in accordance with the reaction conditions, namely the proportions of material used, temperature, reaction time, etc. In order to suppress byproduct polymer formation, it is also desirable to distill the products under reduced pressures at as low a temperature as possible and as quickly as possible.

When metal hydrides themselves are used in the practice of this invention, it is generally difficult to interrupt the reactions to give substitution of lower degree than full substitution. When it is desired to introduce a lower number of such groups, it is generally desirable to use a metal hydride compound having the same number of hydrogen atoms thereon as correspond to the number of substituent groups desired, or the metal hydride compound can be one fully substituted with hydrocarbon groups and by controlling concentrations and reaction conditions, these hydrocarbon groups can be replaced to the desired degree by the proper number of substituent groups.

The optimum reaction temperature depends somewhat on the nature of the metal hydride compound as well as the alkenyl compound. With the hydrides themselves, the reaction proceeds rapidly at a temperature from room temperature up to 50° C. or 60° C., depending on the type of ethylenic group in the alkenyl compound. Vinyl and vinylidene groups react readily at room temperature. The reaction proceeds most rapidly with vinyl and vinylidene types of compounds, and requires longer reaction periods or higher temperatures with ethylenic groups which have substituents on both carbon atoms. In some cases, it is desirable to have the temperature below room temperature and to use longer reaction periods so as to control the type and degree of addition. This is particularly true when the alkenyl compound is a polyunsaturated compound. The lower temperatures in such cases suppress the formation of byproduct polymers. When the metal hydride compound is partially substituted with hydrocarbon groups, reaction temperatures in the range of 40° C.–60° C. are generally suitable, depending on the degree of substitution desired and the type and number of ethylenic groups present in the alkenyl compound. If only the hydrogen in such hydride compound is to be reacted, a lower temperature is desirably maintained to prevent simultaneous or subsequent replacement of the hydrocarbon groups, which generally form the corresponding olefin or unsaturated compound as a byproduct. Also, if the alkenyl compound is a polyunsaturated compound, then the lower temperatures are preferably used to prevent byproduct polymer formation.

The use of higher temperatures favors the replacement of hydrocarbon groups, particularly where the hydrocarbon groups are to be completely replaced by the alkenyl compounds. However, when the alkenyl compound is a polyunsaturated one, such higher temperatures also favor byproduct polymer formation. It is desirable, therefore, to use longer reaction times with lower temperatures and appropriate concentrations to favor substitution without byproduct polymer formation. In such cases, the use of inert diluents is also advantageous.

The products obtained by the practice of this invention can be represented by the formula $$X_2B—CR_2—Z—R'$$

wherein X is R' or another —$CR_2$—Z—R' group, R is hydrogen or a hydrocarbon group, R' is a hydrocarbon group, and Z is an ether oxygen or a divalent group having at least one hydrocarbon portion and at least one ether oxygen therein. The latter ether oxygen can be between the two valencies or can be on a side chain off a hydrocarbon portion. The R, R', and Z groups include hydrocarbon groups which can be connected to another of said groups to form a cyclic group.

When the ether starting material is a monoalkenyl compound, the resulting boron derivative has no ethylenic unsaturation therein, and, therefore, in such cases, X, R, Z, and R' are all saturated in the hydrocarbon portions thereof. Such products can be represented by $$X''_2B—CR'''_2—Z''—R''$$

in which X'' represents R'' or another $$—CR'''_2—Z''—R''$$

group, R'' is a saturated hydrocarbon group, and R''' is hydrogen or a saturated hydrocarbon group, and Z'' corresponds to Z, except that there can be no ethylenic unsaturation therein.

The monoalkenyl starting materials can be represented by the formula

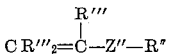

in which R''', Z'', and R'' are as defined above. The hydrocarbon groups of R''', Z'', and R'' can have substituents attached thereto which are nonreactive with the boron reagents. The various R'' and R''' groups can also be polyvalent hydrocarbon groups, which are also connected with a Z'', R'', or R''' group to form a cyclic group.

Upon reaction with boron compounds, which can be represented as $BR'''_3$, with R''' as defined above, the reaction can be represented as

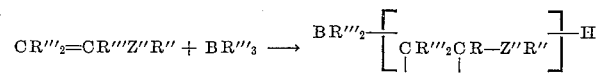

When the ether starting material or alkenyl compound has a plurality of ethylenically unsaturated groups therein, boron-organo products can be obtained having ethylenic unsaturation, which lends itself to further reactions or to addition polymerization catalyzed by free radicals, such as generated by diazo compounds, such as, for example, those disclosed in U.S. Patent No. 2,471,959, by ionizing radiation, and by heterogeneous surface catalysts, to give polymeric compositions having high proportions of boron therein. These polymer products are suitable for use as propellant fuel for rockets, missiles, and related devices.

The polyunsaturated starting material can be represented by the formula $$CR_2=CR—Z—CR=CR_2$$

wherein R and Z are as defined above. Other substituents can also be attached to the hydrocarbon groups of R and Z provided they are not reactive with the boron reagent. However, additional alkenyl groups can be attached directly or indirectly to such hydrocarbon groups so as to have three or more ethylenically unsaturated groups in the starting compound.

As indicated hereinafter, the addition of the boron hydride compound can give an ether compound having a plurality of boron substitutions in the starting compound, or can be controlled to limit the number of boron additions to a number less than the number of ethylenic groups in the starting material and thereby produce a product having ethylenic unsaturation therein, which can be subsequently reacted by addition of other materials or by addition polymerization. The products obtained by the addition or boron hydride compounds to such polyalkenyl starting materials are represented by the following Reactions I, II, III, and IV, in which I illustrates the addition of boron to two of the ethylenic groups in one molecule of the polyalkenyl compound, II illustrates the addition of boron to only one of the ethylenic groups, III illustrates the addition of a boron atom to one ethylenic group in each of two molecules of the polyalkenyl compound, and IV illustrates the addition of a boron atom to one ethylenic group in each of three molecules of the polyalkenyl compound.

(I)

$2BR_3 + CR_2=CR-Z-CR=CR_2 \longrightarrow$

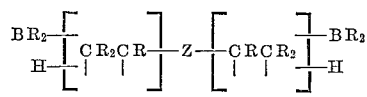

(II)

$BR_3 + CR_2=CR-Z-CR=CR_2 \longrightarrow$

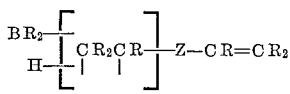

(III)

$BR_3 + 2CR_2=CR-Z-CR=CR_2 \longrightarrow$

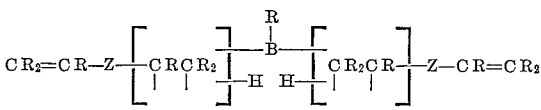

(IV)

$BR_3 + 3CR_2=CR-Z-CR=CR_2 \longrightarrow$

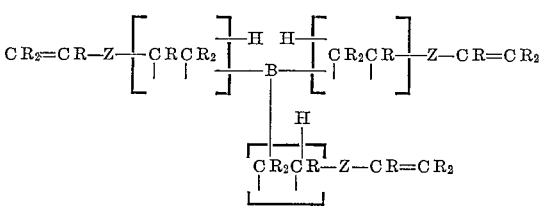

In the above reactions, Reaction I is favored by the use of di-substituted borane, the use of little excess polyalkenyl compound over the stoichiometric amount indicated in the reaction, and the use of temperatures favoring hydrogen reaction, but not displacement of hydrocarbon groups.

Reaction II is favored by the use of di-substituted boranes, an excess of 3 moles or more polyalkenyl compound per mole of borane over that indicated as participating in the reaction, and the use of temperatures favoring hydrogen reaction but not displacement of hydrocarbon groups. Prolonged reaction periods should also be avoided, and distillations to remove unreacted polyalkenyl compound, or to fractionate the desired product should be performed as quickly and at as low a temperature as possible.

Reaction III is favored by the use of mono-substituted boranes, high concentrations of polyalkenyl compound (advantageously 4 moles or more in excess of the 2 moles indicated as reacting per mole of $BR_3$), and the use of temperatures favoring hydrogen reaction but not displacement of R groups. Again prolonged reaction periods should be avoided, and any distillation to be performed should be as rapid and at as low a temperature as possible.

Reaction IV is favored by the use of a boron hydride, by considerable excess of polyalkenyl compound, advantageously in excess of 6 moles or more of polyalkenyl compound per mole of borane, and the use of temperatures favoring hydrogen reaction but not displacement of hydrocarbon groups. Again prolonged reaction periods, high distillation temperatures, and prolonged distillations should be avoided.

While the foregoing conditions are indicated as favorable toward the production of the particular products indicated, such products can be obtained under conditions other than those indicated. In such cases, however, the byproduct production of more highly substituted products or polymers is generally increased. Furthermore, the fully substituted boranes can also be used to produce such products. For example, the reaction of a fully substituted borane with a polyalkenyl compound at a temperature favorable to replacement of the hydrocarbon groups is stopped or retarded after a comparatively short reaction period by lowering the temperature so as to obtain a reaction mixture containing products having various degrees of substitution of the borane. Then by the application of reduced pressures, the products can be fractionated at relatively low temperatures which do not favor further reaction or substitution. In the reactions using unsubstituted or partially substituted boranes, it is also advantageous, when the reaction has proceeded to the desired degree, to stop or retard further reaction by reducing the temperature and then applying reduced pressures to recover the product at temperatures advantageously below those at which the reaction occurs.

In the above reactions, the products have been represented by formulas which do not indicate the exact point of attachment of the boron atoms. The exact location of the boron depends on the type and size of the groups attached to the ethylenic carbon atoms. When the ethylenic group is a vinyl or vinylidene group, the boron is preferentially attached to the terminal carbon atom. However, when one or both of the R groups attached to that carbon atom is an alkyl group, the affinity of the boron for that carbon may be reduced to a degree where the boron affinity for the other carbon atom of the ethylenic group is equal to or less than that for the first carbon. This is particularly so when the single R of the other carbon atom is hydrogen and one or both of the R groups on the first carbon is a large hydrocarbon group. Therefore, the boron atom may become attached to the second carbon atom instead of the first.

Various methods of practicing the invention are illustrated by the following examples. These examples are intended merely to illustrate the invention and not in any sense to limit the manner in which the invention can be practiced. The parts and percentages recited therein, and also in the specification, unless specifically provided otherwise, refer to parts by weight and percentages by weight. Unless indicated otherwise, the terms "polymer" and "polymeric" are intended to include "copolymers" and "copolymeric."

EXAMPLE I

A solution of 216 parts of vinyl ethyl ether in 200 parts of hexane is prepared and maintained under a nitrogen atmosphere and at room temperature. Diborane is passed into the solution at such a rate that the temperature of the reaction mixture does not rise more than 5 degrees. When 14 parts of the diborane has been absorbed, the diborane feed is cut off and the reaction allowed to continue another 30 minutes. Then the temperature is gradually raised above the boiling point of the hexane in order to remove unreacted ether, diborane and hexane. When it appears that hexane is no longer being removed, the reaction mixture is cooled to room temperature and weighed. 205 parts of product are obtained, which represents an 89 percent yield of tri-(beta-ethoxy-ethyl) boron. Ultimate analyses show 61.77% carbon, 11.76% hydrogen, 20.74% oxygen, and 5.73% boron, which values check closely with the theoretical values. This product is used successfully to catalyze the addition of diborane to amylene at room temperature.

The product is further identified by oxidation to the corresponding alcohol by the following procedure. One-half mole of the product is treated with 0.2 mole sodium hydroxide in 100 cc. of ethyl alcohol, and then 60 grams of 30 percent hydrogen peroxide is added to the mixture at such a rate as to maintain gentle reflux. After the addition is completed, the product is taken up in ether, washed and dried. The oxidation product from the tri-(beta-ethoxy-ethyl) boron distills at 135.1° C. in 86 percent yield, and is identified as glycol monoethyl ether.

EXAMPLE II

The procedure of Example I is repeated 9 times, using different monoalkenyl ether as indicated in Table I below, and in amount equivalent to that of the vinyl ethyl ether used in Example I. In those cases in which the boiling point of the monoalkenyl ethers are above 100° C., the unreacted ethers are removed by reducing the pressures as much below atmospheric as is necessary to distill off the unreacted ethers at temperatures below 100° C. The percentage yields of the boron-organo products are indicated, as well as the oxidation products by which these compounds are identified, together with the boiling point of the resultant alcohols, and their percentage yields based on the amount of boron-organo product used in the oxidation. These boron-organo products are successfully tested as in Example I to catalyze the addition of diborane to amylene.

procedure of Example I, the product yields approximately 1 mole of methanol per mole of borane product oxidized. The yield of beta-vinyloxy-ethanol from this oxidation is less than theoretical, apparently because the excess peroxide also attacks to some extent the double bond of the product. A sample of the product is mixed with 25% styrene and polymerized at 60° C. for 15 hours with 1% of 1-azo-bis-cyclohexane carbonitrile to give a product that has excellent burning and thrust properties.

EXAMPLE V

The procedure of Example III is repeated, except that

*Table I*

| Monoalkenyl Ether | Boron-organo Product | | Oxidation Derivative | | |
|---|---|---|---|---|---|
| | Identity | Percent yield | Identity | Percent yield | B.P. °C. |
| Allyl ethyl ether | B(CH$_2$CH$_2$CH$_2$OC$_2$H$_5$)$_3$ | 89.4 | 3-Ethoxy-n-propanol | 92.2 | 160–1. |
| Vinyl-n-butyl ether | B(CH$_2$CH$_2$OC$_4$H$_9$)$_3$ | 88.2 | Glycol mono-n-butyl ether | 88.7 | 171–2. |
| Isopropenyl isopropyl ether | B[CH$_2$CHOCHCH$_3$ \| \| CH$_3$ CH$_3$]$_3$ | 87.4 | 2-Isopropoxy-n-propanol | 89.5 | 141–2/736 mm. |
| Vinyl phenyl ether | B(CH$_2$CH$_2$OC$_6$H$_5$)$_3$ | 88. | Glycol monophenyl ether | 88.5 | 237. |
| Cyclohexenyl ethyl ether | B(C$_6$H$_{10}$OC$_2$H$_5$)$_3$ | 89.2 | Ethoxy cyclohexanol | 88.3 | 195. |
| Vinyl benzyl ether | B(CH$_2$CH$_2$OCH$_2$C$_6$H$_5$)$_3$ | 87.6 | Glycol monobenzyl ether | 86.8 | 256. |
| p-Methoxy styrene | B(CH$_2$CH$_2$C$_6$H$_4$OCH$_3$)$_3$ | 89.4 | beta-Hydroxyethyl anisole | 86.5 | 143–5/at 17–18 mm. |
| Vinyl(p-t butyl-phenyl)ether | B(CH$_2$CH$_2$OC$_6$H$_4$C$_4$H$_9$)$_3$ | 89.5 | beta(p-t-Bu-phenoxy)ethanol | 86.7 | 148–52/at 8–10 mm. |
| Allyl phenyl ether | B(CH$_2$CH$_2$CH$_2$OC$_6$H$_5$)$_3$ | 89.1 | 3-Phenoxy-n-propanol | 88.2 | 248–250. |

EXAMPLE III

To a solution of 350 parts of divinyl ether in 500 parts of hexane, maintained at a temperature of −10° C., and under an atmosphere of nitrogen, is added 42 parts of tetramethyl diborane. The temperature is allowed to rise to 0° C. and maintained there for a period of one hour. Then the pressure on the system is gradually reduced so as to evaporate solvent and excess ether, while the temperature is maintained at 0° C. When it appears that the excess ether is no longer being removed at a reduced pressure of 20 mm., hydrogen is fed into the system until normal atmospheric pressure is resumed. A yield of 86.4% of theoretical of dimethyl beta-vinyloxy-ethyl borane is obtained which gives ultimate analyses of 64.08% carbon, 11.49% hydrogen, 14.75% oxygen, and 9.68% boron, all of which values check closely with the theoretical values. Oxidation, according to the method of Example I, yields methanol in the ratio of approximately 2 moles of methanol per mole of dimethyl beta-vinyloxy-ethyl borane used. The yield of beta-vinyloxy-ethanol (B.P. 44–45°/10 mm.) from the oxidation is less than the calculated amount since the double bond is apparently attacked to some extent by the excess peroxide. A sample of the reaction product is mixed with 25% of a mixture of 50–50 divinyl benzene and ethyl styrene and polymerized for 15 hours at 60° C. with 1% of 1-azobis-isobutyronitrile as catalyst to give a product having excellent burning and thrust properties.

Upon repetition of the foregoing procedure using an equivalent amount of allyl vinyl ether, a mixed product is obtained which has both beta-allyloxyethyl groups and 3-vinyloxy-n-propyl groups, since oxidation yields both beta-allyloxy ethanol and 3-vinyloxy-n-propanol.

EXAMPLE IV

The procedure of Example III is repeated, using 28 parts of symmetrical dimethyl diborane in place of the tetramethyl borane, and 420 parts of divinyl ether in place of the 350 parts used in Example III. Methyl bis-(beta-vinyloxy-ethyl) borane is obtained in a yield of 85.6 of theoretical. The product gives ultimate analyses of 64.06% carbon, 10.01% hydrogen, 19.54% oxygen, and 6.39% boron, all of which values check closely with the theoretical values. Upon oxidation, according to the 700 parts of divinyl ether and 1,000 parts of hexane are used and, in place of the tetramethyl borane, diborane is fed into the reaction mixture until 14 parts have been absorbed. A yield of 84.6% of theoretical of tri-(beta-vinyloxy-ethyl) borane is obtained. Ultimate analyses give 64.41% carbon, 9.29% hydrogen, 21.15% oxygen, and 5.15% boron, all of which values check closely with the theoretical values. A sample of the borane product is polymerized at 60° C. for 15 hours with 1% of 2-azo-bis-2-methylheptonitrile as catalyst to give a solid product having excellent burning and thrust properties.

EXAMPLE VI

A mixture of 1,000 parts diallyl ether and 98 parts of triethyl boron is prepared by adding the triethyl boron to the diallyl ether and maintaining the temperature at about 25° C. under a blanket of nitrogen. The temperature is maintained for a period of one hour and byproduct ethylene allowed to escape. The temperature is then reduced to 0° C. and the pressure reduced gradually to remove unreacted diallyl ether. When diallyl ether is no longer given off, the reaction system is allowed to resume normal atmospheric pressure under an atmosphere of nitrogen. The product represents an 87.6% yield of theoretical for tri-(3-allyloxy-n-propyl)-borane. Ultimate analyses give 70.69% carbon, 10.88% hydrogen, 15.02% oxygen, and 3.81% boron, all of which values check closely with the theoretical values of tri-(3-allyloxy-n-propyl)-borane. This product is polymerized for 15 hours at 60° C. using 1% 2,2'-azo-bis-2-ethylbutyronitrile as catalyst to give a solid resin having excellent burning and thrust properties. Oxidation of the monomer as in Example I gives 3-allyloxy-n-propanol.

EXAMPLE VII

The procedure of Example VI is repeated, using 140 parts of tri-propyl boron and 1700 parts of divinyloxy cyclohexane. Tri-(vinyloxy-cyclohexyloxy-ethyl)-boron is obtained in a yield representing 86.2% of theoretical. Ultimate analyses gives 69.34% carbon, 9.69% hydrogen, 18.62% oxygen, and 2.05% boron, all of which values check closely with theoretical values.

EXAMPLE VIII

The procedure of Example VI is repeated, using 182 parts of tri-isobutyl boron in place of the tri-ethyl boron, and 1700 parts of the divinyl ether of resorcinol in place of the diallyl ether. A yield of tri-(vinyloxy-phenoxy-ethyl)-borane is obtained, which represents 85.8% of theoretical. Ultimate analyses gives 71.36% carbon, 6.43% hydrogen, 20.08% oxygen, and 2.13 boron, all of which values check closely with the theoretical values.

EXAMPLE IX

The procedure of Example VI is repeated, using a number of different tri-substituted borons and di-alkenyl ether, each used in amounts equivalent to the amount of tri-ethyl boron and diallyl ether, respectively, used in Example VI. The table indicates the percentage yield for the triply-unsaturated product in each case.

| Tri-substituted borane | Dialkenyl compound | Percent of theoretical yield |
| --- | --- | --- |
| Tri-pentyl boron | Vinyloxy styrene | 87.3 |
| Tri-phenyl boron | Ethylene glycol diallyl ether | 88.6 |
| Tri-cyclohexyl boron | Ethoxy-divinyl benzene | 84.8 |
| Tri-benzyl boron | Allyloxy-cyclohexene | 83.6 |

EXAMPLE X

The procedure of Example VI is repeated, using an equivalent amount of p-vinyloxy styrene in place of the diallyl ether. However, the pressure is not reduced to remove unreacted ether, and, instead, the catalyst is added directly to the reaction mass and polymerization effected to give an infusible mass containing boron.

EXAMPLE XI

The procedure of Example VI was repeated, using 500 parts instead of the 1,000 parts of the diallyl ether, and maintaining the temperature at about 40° C. for three hours. Then the reaction is completed as in Example VI. Ultimate analyses give 70.07% carbon, 11.69% hydrogen, 12.10% oxygen, and 5.96% boron. These analyses indicate that a considerable proportion of byproduct polymer and derivative resulting from the addition of 2 atoms of boron to the diallyl ether are probably formed, whereas the ultimate analyses of Example VI indicate that if any impurities are present in that product they are probably small amounts of the compounds resulting from incomplete replacement of the ethyl groups. The presence of these byproducts is confirmed by oxidizing as in Example I, following which distillation of the product gives a 3,3′-dihydroxy-di-n-propyl ether fraction (B.P. 155–160° C./15 mm.) as well as the expected 3-allyloxy-n-propanol.

EXAMPLE XII

Samples of the monomers obtained in Examples III through IX are individually treated with irradiation doses of 50 megareps derived from an irradiation source equivalent to 100,000 electron volts, in each case separate samples being exposed to irradiation from an electron accelerator of the Arco type, a Van de Graaff generator, cobalt 60, X-rays, and bombarded beryllium. In each case a solid polymer product is obtained which exhibits excellent burning and thrust properties.

EXAMPLE XIII

The monomers of Examples III through VIII are polymerized individually using 0.5 percent of iodine as catalyst. A solid polymeric product is obtained in each case, which upon testing shows excellent combustion and propellant thrust properties.

EXAMPLE XIV

Samples of each of the polymer products obtained in Examples III through VIII, respectively, are individually ground under an atmosphere of nitrogen with 50 percent potassium perchlorate, 60 percent ammonium nitrate, and 70 percent ammonium perchlorate, respectively, to give mixtures which give excellent results when tested for combustion and propellant thrust properties.

Compounds prepared by the practice of this invention include, but are not restricted to the following, in some of which compounds "b" is used to indicate "beta" substitution:

tri-(b-ethoxy-ethyl)-boron,
methyl-di-(b-ethoxy-ethyl)-boron,
ethyl-di-(b-ethoxy-ethyl)-boron,
butyl-di-(b-ethoxy-ethyl)-boron,
dimethyl-(b-ethoxy)-boron,
diethyl-(b-ethoxy-ethyl)-boron,
dipropyl-(b-ethoxy-ethyl)-boron,
tri-(b-isopropoxy-ethyl)-boron,
methyl-di-(b-isopropoxy-ethyl)-boron,
diethyl-(b-isopropoxy-ethyl)-boron,
tri-(n-butoxy-ethyl)-boron,
ethyl-di-(b-butoxy-ethyl)-boron,
diethyl-(b-butoxy-ethyl)-boron,
tri-(b-amyloxy-ethyl)-boron,
propyl-di-(b-amyloxy-ethyl)-boron,
dipropyl-(bamyloxy-ethyl)-boron,
tri-(b-phenethyloxy-ethyl)-boron,
propyl-di-(b-phenethyloxy-ethyl)-boron,
dipropyl-(phenethyloxy-ethyl)-boron,
tri-(b-phenoxy-ethyl)-boron,
ethyl-di-(b-phenoxy-ethyl)-boron,
diethyl-(b-phenoxy-ethyl)-boron,
tri-(b-cyclohexyloxy-ethyl)-boron,
propyl-di-(b-cyclohexyloxy-ethyl)-boron,
diethyl-(b-cyclohexyloxy-ethyl)-boron,
tri-(b-benzyloxy-ethyl)-boron,
butyl-di-(b-benzyloxy-ethyl)-boron,
dibutyl-(b-benzyloxy-ethyl)-boron,
tri-(b-cyclopentyloxy-ethyl)-boron,
tri-(b-naphthyloxy-ethyl)-boron,
amyl-di-(b-naphthyloxy-ethyl)-boron,
tri-(3-ethoxy-n-propyl)-boron,
methyl-di-(3-ethoxy-n-propyl)-boron,
dimethyl-(3-ethoxy-n-propyl)-boron,
tri-(3-butoxy-n-propyl)-boron,
butyl-di-(3-amyloxy-n-propyl)-boron,
dipropyl-(3-amyloxy-n-propyl)-boron,
tri-(3-phenethyloxy-n-propyl)-boron,
ethyl-di-(3-phenethyloxy-n-propyl)-boron,
diamyl-(3-phenethyloxy-n-propyl)-boron,
tri-(2-phenoxy-n-propyl)-boron,
propyl-di-(2-phenoxy-n-propyl)-boron,
dibutyl-(2-phenoxy-n-propyl)-boron,
tri-[beta-(phenoxyphenyl)-ethyl]-boron,
diethyl-[beta-(phenoxyphenyl)-ethyl]-boron,
phenyl-di-[3-(ethoxyphenyl)-n-propyl]-boron,
distyryl-[b-(ethoxynaphthyl)-ethyl]-boron,
dicyclohexyl-[beta-(4′-ethoxy-diphenyl)-ethyl]-boron,
tri-(p-ethoxy-phenethyl)-boron,
tri-(4-butoxy-cyclohexyl-ethyl)-boron,
tri-(1-methyl-3-ethoxy-n-propyl)-boron,
tri-[beta-(beta-ethoxy-ethoxy)-ethyl]-boron,
tri-[beta-(beta-ethoxy-phenoxy)-ethyl]-boron,
tri-(1-ethoxy-methyl-3-methoxy-n-propyl)-boron,
tri-(b-vinyloxy-ethyl)-boron,
methyl-di-(b-vinyloxy-ethyl)-boron,
dimethyl-(b-vinyloxy-ethyl)-boron,
ethyl-di-(b-vinyloxy-ethyl)-boron,
dipropyl-(b-vinyloxy-ethyl)-boron,
butyl-(b-vinyloxy-ethyl)-boron,
diamyl-(b-vinyloxy-ethyl)-boron,
phenethyl-di-(b-vinyloxy-ethyl)-boron,
diphenyl-(b-vinyloxy-ethyl)-boron,
cyclohexyl-di-(b-vinyloxy-ethyl)-boron,
dibenzyl-(b-vinyloxy-ethyl)-boron,
tri-(3-allyloxy-n-propyl)-boron,
methyl-di-(3-allyloxy-n-propyl)-boron,
dimethyl-(3-allyloxy-n-propyl)-boron,
ethyl-di-(3-allyloxy-n-propyl)-boron, dibutyl-(3-allyloxy-n-propyl)-boron,
phenethyl-(3-allyloxy-n-propyl)-boron,
diphenyl-(3-allyloxy-n-propyl)-boron,
dicyclohexyl-(3-allyloxy-n-propyl)-boron,
benzyl-di-(3-allyloxy-n-propyl)-boron,
tri-(2-isopropenyloxy-n-propyl)-boron,
methyl-di-(2-isopropenyloxy-n-propyl)-boron,
dimethyl-(2-isopropenyloxy-n-propyl)-boron,
diethyl-(2-isopropenyloxy-n-propyl)-boron,
propyl-di-(2-isopropenyloxy-n-propyl)-boron,
dibutyl-(2-isopropenyloxy-n-propyl)-boron,
amyl-di-(2-isopropenyloxy-n-propyl)-boron,
diphenethyl-(2-isopropenyloxy-n-propyl)-boron,
ethoxyphenyl-di-(2-isopropenyloxy-n-propyl)-boron,
dibenzyl-(2-isopropenyloxy-n-propyl)-boron,
tri-[beta-(p-vinyloxy-phenoxy)-ethyl]-boron,
methyl-di-[beta-(p-vinyloxy-phenoxy)-ethyl]-boron,
dipropyl-[beta-(p-vinyloxy-phenoxy)-ethyl]-boron,
butyl-di-[beta-(p-vinyloxy-phenoxy)-ethyl]-boron,
diamyl-[beta-(p-vinyloxy-phenoxy)-ethyl]-boron,
diphenethyl-[beta-(p-vinyloxy-phenoxy)-ethyl]-boron,
phenyl-di-[beta-(p-vinyloxy-phenoxy)-ethyl]-boron,
cyclohexyl-di-[beta-(p-vinyl-phenoxy)-ethyl]-boron,
benzyl-di-[beta-(p-vinyloxy-phenoxy)-ethyl]-boron,
tri-[3-(allyloxy-phenoxy)-n-propyl]-boron,
methyl-di-[3-(allyloxy-phenoxy)-n-propyl]-boron,
diethyl-[3-(allyloxy-phenoxy)-n-propyl]-boron,
dipropyl-[3-(allyloxy-phenoxy)-n-propyl]-boron,
butyl-di-[3-(allyloxy-phenoxy)-n-propyl]-boron,
diamyl-[3-(allyloxy-phenoxy)-n-propyl]-boron,
phenethyl-di-[3-(allyloxy-phenoxy)-n-propyl]-boron,
diphenyl-[3-(allyloxy-phenoxy)-n-propyl]-boron,
cyclohexyl-di-[3-(allyloxy-phenoxy)-n-propyl]-boron,
dibenzyl-[3-(allyloxy-phenoxy)-n-propyl]-boron,
tri-[beta-(vinyloxy-phenethyl)-ethyl]-boron,
methyl-di-[beta-(vinyloxy-phenyl)-ethyl]-boron,
diethyl-[beta-(vinyloxy-phenyl)-ethyl]-boron,
tri-[beta-(vinyl-phenoxy)-ethyl]-boron,
tri-[b-(p-vinyl-m-ethoxy-phenyl)-ethyl]-boron,
dimethyl-[b-(p-vinyl-m-ethoxy-phenyl)-ethyl]-boron,
propyl-di-[b-(p-vinyl-m-ethoxy-phenyl)-ethyl]-boron,
tri-(b-allyloxy-ethyl)-boron,
tri-(3-vinyloxy-n-propyl)-boron,
di-(3-vinyloxy-n-propyl)-(allyloxy-ethyl)-boron,
tri-(b-crotyloxy-ethyl)-boron,
tri-(b-isopropenyloxy-ethyl)-boron,
tri-b-[b-(b-vinyloxy-ethoxy)-ethoxy]-ethyl-boron,
tri-b-(divinyl-phenyl)-ethyl-boron,
bis-(b-dimethyl-boro-ethyl)-styrene,
tri-(b-cyclohexenyloxy-ethyl)-boron,
tri-b-(ethoxy-cyclohexenyl)-ethyl-boron,
tri-[b-(2-ethoxy-4-vinyl-cyclohexyl)-ethyl]-boron,
tri-(cyclohexenyloxy-cyclohexyl)-boron,
tri-(dihydrofuryl)-boron, etc.

In polymerizing the polymerizable monomers of this invention, various other polymerizable ethylenic compounds can be used to modify the properties of the resultant polymers. For example, as comonomers there can be used: styrene, divinyl benzene, vinyl toluene, divinyl naphthalene, divinyl ether, vinyl ethyl ether, isobutylene, butadiene, vinyl cyclohexene, divinyl cyclohexene, diallyl ether, isopropenyl benzene, allyl benzene, etc. Furthermore, the properties of the polymers can also be modified by the addition of other polymeric materials, such as, for example, polystyrene, polyisobutylene, synthetic and natural rubber, and other polymers and copolymers of polymerizable ethylenic compounds, such as those listed above as suitable as comonomers. These can be added in various proportions, depending on the particular type of properties desired in the resultant mixtures. Furthermore, various other materials can be added to modify the properties of the monomers and polymers of this invention, for example, oxidizing agents as illustrated above, inhibitors, auxiliary fuel materials, etc. When heterogeneous surface active catalysts, such as the Ziegler catalyst system, are used to catalyze the polymerization of the monomers of this invention, it is advantageous that any oxidizing compounds used be completely reduced before these new monomers are added. For example, in a system using titanium tetrachloride, in which titanium tetrachloride is reduced and thereby oxidizes an aluminum alkyl compound, and the resultant product is used to catalyze polymerization, it is desirable to use excess aluminum alkyl compounds to completely deactivate the titanium tetrachloride. If the oxidizing compound is not completely reacted, it will react with some of the boron monomer and thereby decrease the yield of polymeric material.

While certain features of this invention have been described in detail with respect to various embodiments thereof, it will, of course, be apparent that other modifications can be made within the spirit and scope of this invention, and it is not intended to limit the invention to the exact details shown above, except insofar as they are defined in the following claims.

The invention claimed is:

1. A new compound containing boron and ether groups therein having the formula $X_2B$—$CR_2$—$Z$—$R'$ wherein:

R is a radical selected from the class consisting of hydrogen and hydrocarbon groups;

X is a group selected from the class consisting of R' and —$CR_2$—$Z$—$R'$ groups;

R' is a hydrocarbon radical; and

Z is selected from the class consisting of an oxygen atom and divalent groups each consisting of at least one ether oxygen and at least one hydrocarbon portion, the combined hydrocarbon portion of $$-CR_2-Z-R'$$

portion of said formula having no more than 16 carbon atoms therein.

2. A compound of claim 1, in which said hydrocarbon groups are saturated hydrocarbon groups and at least one of said X groups represents R'.

3. A compound of claim 1, in which said group $CR_2$—$Z$—$R'$ contains ethylenic unsaturation.

4. A compound of claim 1, in which R' is a vinyl group.

5. A compound of claim 1, in which R' is a vinylidene group.

6. A compound of claim 1, in which one of said X groups is a —$CR_2$—$Z$—$R'$ group.

7. A polymerization product of a compound of claim 1, in which both X groups are —$CR_2$—$Z$—$R'$ groups and R' is a vinyl group.

8. Tri-(beta-vinyloxy-ethyl)-boron.

9. Tri-(3-allyloxy-n-propyl)-boron.

10. Dimethyl-(beta-vinyloxy-ethyl)-boron.

11. Dimethyl-(3-allyloxy-n-propyl)-boron.

12. A process for preparing boron derivatives comprising the step of reacting a mixture consisting essentially of an ethylenically unsaturated compound containing at least one ether group therein and having no groups therein other than hydrocarbon and ether groups, said ethylenically unsaturated compound having no more than 18 carbon atoms therein, the reaction temperature being limited when there is more than one ethylenic group present in the ether compound to no higher than 40° C., and a boron compound selected from the class consisting of diborane and tri-hydrocarbon-substituted borane.

13. A process for preparing boron-containing compounds comprising the steps of reacting a mixture consisting essentially of a compound having only one ethylenic group and at least one ether group therein, and having no groups therein other than hydrocarbon and ether groups, said compound containing said ethylenic group having no more than 18 carbon atoms therein, a boron compound selected from the class consisting of diborane and tri-hydrocarbon-substituted borane.

14. A process of claim 13, in which said ethylenic group is a vinyl group.

15. A process of claim 12, in which said ether compound contains a vinyl group.

16. A process for preparing a boron derivative comprising the step of reacting a mixture consisting essentially of a vinyl ether compound having no more than 18 carbon atoms and having no groups therein other than ether groups and hydrocarbon groups, and a boron compound selected from the class consisting of diborane and tri-hydrocarbon-substituted borane, the temperature of said reaction step being no higher than 40° C. when the vinyl ether contains a second ethylenic group therein.

17. A process for the preparation of boron derivatives comprising the step of reacting a mixture consisting essentially of an allyl ether having no more than 18 carbon atoms and having no groups therein other than ether groups and hydrocarbon groups, and a boron compound selected from the class consisting of diborane and tri-hydrocarbon-substituted borane, the temperature of said reaction being limited to no higher than 40° C. when there is a second ethylenic group in the allyl ether.

References Cited in the file of this patent

UNITED STATES PATENTS

| | | |
|---|---|---|
| 2,685,575 | Heiligmann et al. | Aug. 3, 1954 |
| 2,832,759 | Nowlin et al. | Apr. 29, 1958 |
| 2,925,438 | Brown | Feb. 16, 1960 |
| 2,977,391 | Pearl | Mar. 28, 1961 |

OTHER REFERENCES

Brown et al.: J. Org. Chem., vol. 22, pp. 1136–1138 (1957).

Lyle et al.: J. Org. Chem., vol. 21, pp. 61–4 (1956).

Stone et al.: J. Chem. Soc. (London), pp. 2755–9 (1950).

(Copies in Scientific Library.)